Sept. 1, 1970      H. I. SHRUBSALL      3,526,749
WORK-IN-CIRCUIT CONSUMABLE METAL WELDING
Filed Dec. 27, 1968
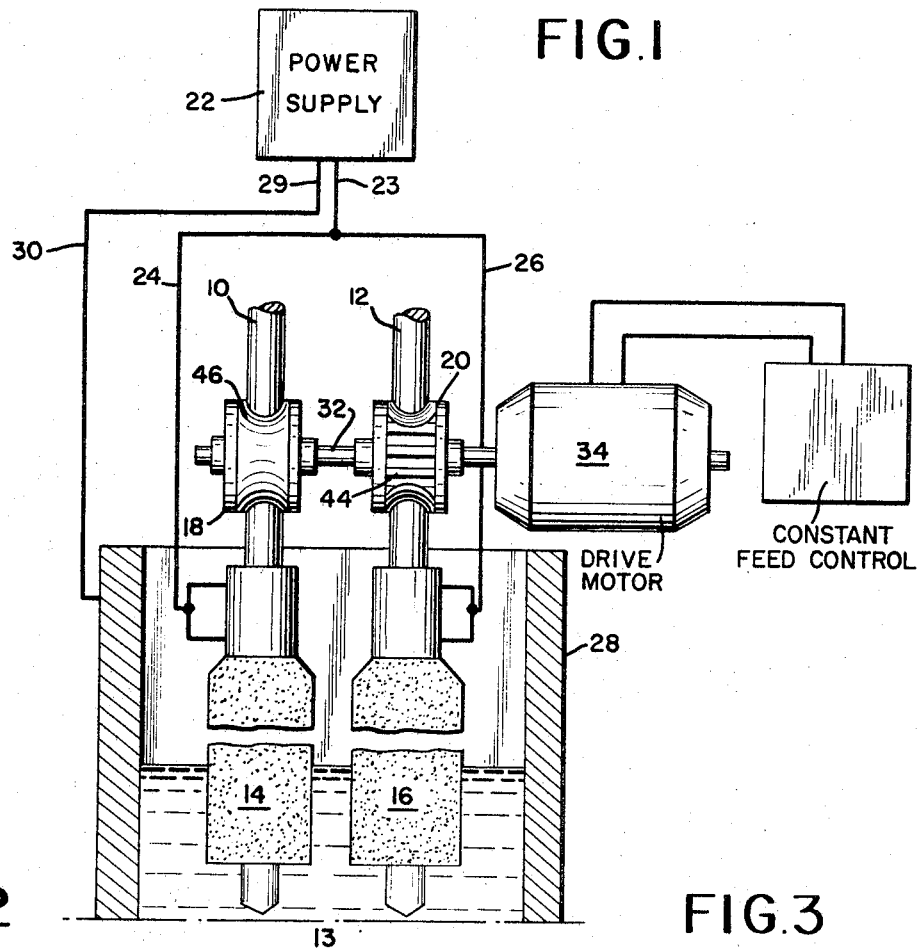
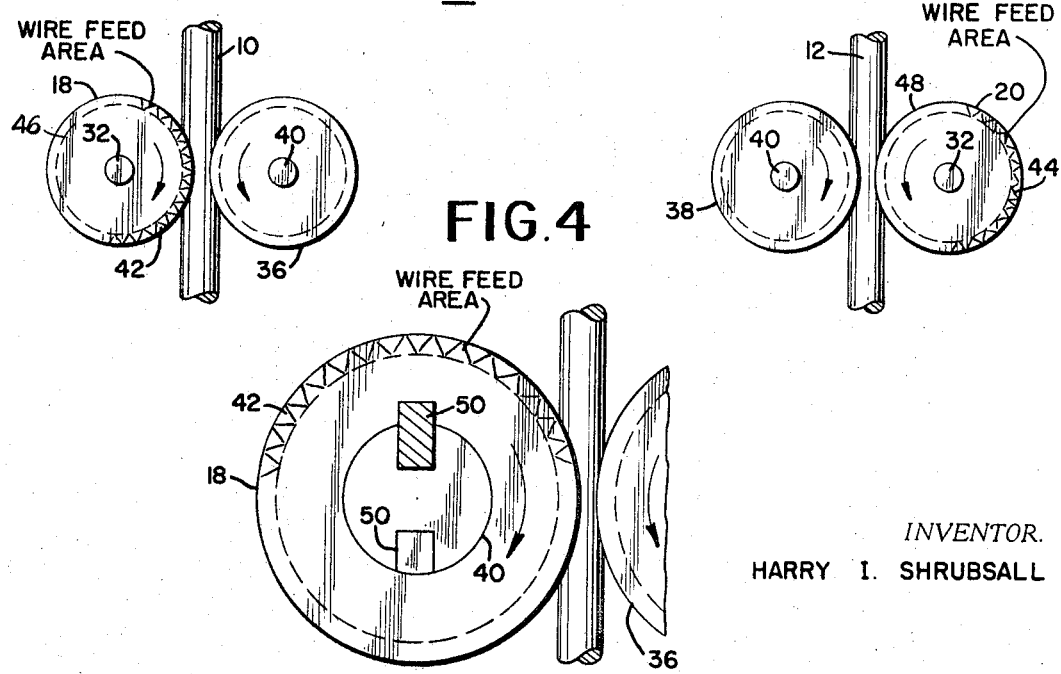
*INVENTOR.*
HARRY I. SHRUBSALL United States Patent Office 3,526,749
Patented Sept. 1, 1970

3,526,749
WORK-IN-CIRCUIT CONSUMABLE METAL WELDING
Harry I. Shrubsall, 431 Westfield Road, Scotch Plains, N.J. 07076
Filed Dec. 27, 1968, Ser. No. 787,505
Int. Cl. B23k 9/10
U.S. Cl. 219—137                                     9 Claims

ABSTRACT OF THE DISCLOSURE

A pair of depending consumable metal electrodes are alternately driven downwardly into a slag covered bath of molten weld metal in making a submerged-melt vertical weld, so that as one electrode is fed the other is stationary, and vice-versa, whereby the heat input is reduced, and the grain structure of the resulting weld metal thereby improved.

---

This invention relates to a work-in-circuit consumable metal electrode welding, and particularly to vertical welding with a plurality of electrodes in the form of wires.

In submerged-melt vertical welding, especially with a plurality of wire electrodes, the heat input may be so great that the grain structure of the resulting weld is undesirably coarse with steel stock.

Such problem is solved according to the present invention by intermittently interrupting the feed of the electrodes to reduce the heat input to the weld. Thus, the rate of electric welding power to the weld supplied through the electrodes is reduced, which corresponding lowers the heat input. A desired grain structure is obtained by simply adjusting the rate of such interruptions.

In the drawing:

FIG. 1 is a fragmentary view, mainly in elevation, of a metal arc welding set-up illustrative of the invention;

FIG. 2 is a fragmentary view in side elevation of one electrode feed;

FIG. 3 is a similar view of the other electrode (non)-feed; and

FIG. 4 is an enlarged view in section of a modification.

As shown in the drawing, metal electrodes 10 and 12 are fed toward the weld zone 13 through flux coated consumable metal guide tubes 14 and 16, respectively, by drive rolls 18 and 20. The guide tubes 14 and 16 are arranged in spaced parallel relationship with each other, and are connected to one terminal 23 of a source of electrical power supply 22 by conductors 24 and 26. The work 28 is connected to the other terminal 29 of the power supply 22 by conductor 30.

The drive rolls 18 and 20 are keyed to a common shaft 32 of a drive motor 34, and are opposed by idler rolls 36 and 38, respectively, on a common shaft 40. The drive rolls 18 and 20 are provided with annular grooves composed of a knurled or drive portion 42, 44, and a smooth or slip (non-drive) portion 46, 48, respectively. The knurled portion 42 of roll 18 is located opposite the knurled portion 44 of roll 20; so that when the former is driving its electrode 10, the latter is not, being contacted by the smooth portion 48 of roll 20. Thus, every half revolution of drive shaft 32, the feed of one electrode is interrupted.

Since there is a "cooling off period" of the molten weld metal when the arc is not established (50% off and 50% on) the weld deposit exhibits a grain structure more favorable to improved toughness of the metal of the resulting weld. Yet there is no adverse affect on the overall arc time for a given weld length, as compared to present day constant wire feeding operations. For example, if vertical welding is practiced as in my U.S. Pat. No. 2,868,951, dated Jan. 13, 1959, using two welding wires at a total welding current of 1,000 amperes (500 amps. per wire) the wire burn off rate for 1/8" dia. wire is approximately 70 i.p.m. per wire, which is approximately 30 lbs. per arc hour for the two wires. According to the present invention, with the same current input (1,000 amps.) and two 1/8" dia. welding wires, only one welding wire is consumed at a time, so that the total current input is concentrated on that one wire. Thus, there exists a calculated wire speed of about 140 i.p.m., which is equal to about 30 lbs. per arc hour for one welding wire if used at a 100% welding rate. However, as the welding wire is used 50% of the time, lbs. per arc hour of deposited weld metal are 15. Resulting in a grand total of 30 lbs. for the two wires. This is the same deposition rate as that obtained when simultaneously feeding two welding wires at a constant speed of 70 i.p.m.

Thus, it is possible to have several welding wires having "firing" or weld sequence patterns which can be varied or "tailor-made" to fit practically any application.

The present invention of "on and off" welding fits in well with conventional submerged arc welding for controlling the weld reinforcement, or penetration depth.

Instead of the drive rolls 18 and 20 being keyed and knurled for driving the electrodes (wires), as shown in FIGS. 1 and 3, they may be keyed and knurled for any desired on-off welding cycling to control the heat input corresponding to weld condition. For example, key slots 50, 50 are provided at different points about the shaft 40, so that the drive rolls can be set in any desired relationship with respect to each other. The same concept can be applied to the drive vs. the smooth surfaces of the drive rolls, as well as to the slots in the rolls for the keys.

Also, one electrode can be supplied with AC power, and the other with DC power, by modifying the circuit so that separate sources are connected to such electrodes.

I claim:

1. A method of refining the grain structure of work-in-circuit vertical submerged-melt welding with consumable metal electrodes that are driven downwardly into a slag covered bath of molten weld metal, which comprises sequentially interrupting the feed of said electrodes so that only one electrode is fed at a time, whereby the heat input is reduced, and the grain structure of the resulting weld metal thereby refined.

2. Method as defined in claim 1, in which only two electrodes are alternately fed toward the weld.

3. Method as defined by claim 2, in which said electrodes are energized by a common source of power supply.

4. Method as defined by claim 2, in which said electrodes are fed by a common drive motor.

5. Method as defined by claim 1, in which one metal welding electrode is periodically fed and not fed toward the weld zone, whereby to control the rate of electric power supplied to the weld.

6. Method as defined by claim 1, in which two electrodes are alternately fed in parallel toward the weld. while energized in parallel circuit relationship with each other from a single source of power supply.

7. Method as defined by claim 1, in which a plurality of wire electrodes are alternately fed and not fed toward the weld zone with like on and off sequences, whereby the heat input is uniformly reduced.

8. Method as defined by claim 1, in which a pair of wire electrodes are driven by a common electrode feed motor drive shaft through drive rolls the circumference of which is half smooth and half knurled with the knurled halves 180 degrees out of phase with each other.

9. Method as defined by claim 8, in which the electrodes are connected to a common source of welding power by parallel leads.

References Cited

UNITED STATES PATENTS

| | | | |
|---|---|---|---|
| 1,942,055 | 1/1934 | Gilbert | 219—137 X |
| 2,658,162 | 11/1953 | Tichenor et al. | 219—130 X |
| 2,837,627 | 6/1958 | Saulary | 219—131 X |
| 2,868,956 | 1/1959 | Lobosco | 219—130 X |
| 3,007,033 | 10/1961 | Newman et al. | 219—130 X |

OTHER REFERENCES 1,152,208 8/63 German printed application, Robner 219/130 1–2.

JOSEPH V. TRUHE, Primary Examiner

C. L. ALBRITTON, Assistant Examiner

U.S. Cl. X.R.

219—131